United States Patent [19]

Streich et al.

[11] 4,249,576

[45] Feb. 10, 1981

[54] RETRIEVABLE PLUG FOR OFFSHORE PLATFORMS HAVING SHEAR TYPE RETAINING MEANS

[75] Inventors: Steven G. Streich; L. Carter Knox; Bob L. Sullaway, all of Duncan, Okla.

[73] Assignee: Halliburton Company, Duncan, Okla.

[21] Appl. No.: 61,566

[22] Filed: Jul. 30, 1979

Related U.S. Application Data

[62] Division of Ser. No. 906,900, May 18, 1978, Pat. No. 4,184,515.

[51] Int. Cl.³ .................. F16L 55/12; E21B 33/12
[52] U.S. Cl. ....................................... 138/89; 166/188
[58] Field of Search .................. 138/89, 90, 93, 94; 166/188, 332, 333, 334, 192

[56] References Cited

U.S. PATENT DOCUMENTS

| 2,651,368 | 9/1953 | Baker et al. | 166/188 |
| 2,776,015 | 1/1957 | Bielstein | 138/89 |
| 3,577,737 | 5/1971 | Burleson | 138/89 X |
| 3,897,824 | 8/1975 | Fisher | 166/188 |
| 4,024,893 | 5/1977 | Jackman et al. | 138/89 |
| 4,077,435 | 3/1978 | Van Scoy | 138/93 |
| 4,142,371 | 3/1979 | Mayfield et al. | 138/89 X |

*Primary Examiner*—James E. Bryant, III
*Attorney, Agent, or Firm*—John H. Tregoning; James R. Duzan

[57] ABSTRACT

A reusable plug for sealing the conductor pipe of offshore platforms comprising a cylindrical housing, central body member and pressure equalization means.

1 Claim, 4 Drawing Figures

RETRIEVABLE PLUG FOR OFFSHORE PLATFORMS HAVING SHEAR TYPE RETAINING MEANS

This is a division, of application Ser. No. 906,900 filed May 18, 1978, now U.S. Pat. No. 4,184,515

This invention relates to a reusable plug for sealing the interior of hollow cylindrical members, in particular, the conductor pipes of an offshore platform. Typically, when constructed, an offshore platform has a plurality of conductor pipes running from the top of the platform to the bottom thereof through which the various wells are drilled from the platform. To give added buoyancy during the setting of the platform the interior of each conductor pipe is sealed to prevent the ingress of water.

A typical prior art plug used to seal the interior of conductor pipe comprises a steel cup retained within a cylindrical housing the same diameter as the conductor pipe and welded thereto. The steel cup is retained within the cylindrical housing by means of a molded elastomeric member which has a portion of the cup retrieving cable spirally wrapped within the elastomeric member. To retrieve the cup from the jacket leg a force is applied to the free end of the cable at the top of the conductor pipe which, in turn, progressively rips the molded elastomeric member apart thereby freeing the steel cup to move upwardly in the conductor pipe. While such a plug is easy to use and manufacture, it cannot be reused.

In contrast to the prior art the present invention is a reusable plug for conductor pipe comprising a cylindrical housing, a central body member and, if desired, a pressure equalization means. The present invention, in contrast to the prior art, can be reused by merely replacing a few expendable items. The foregoing advantages and the preferred embodiments of the present invention will be better understood from the following specification taken in conjunction with the accompanying drawings wherein.

Figure 1:
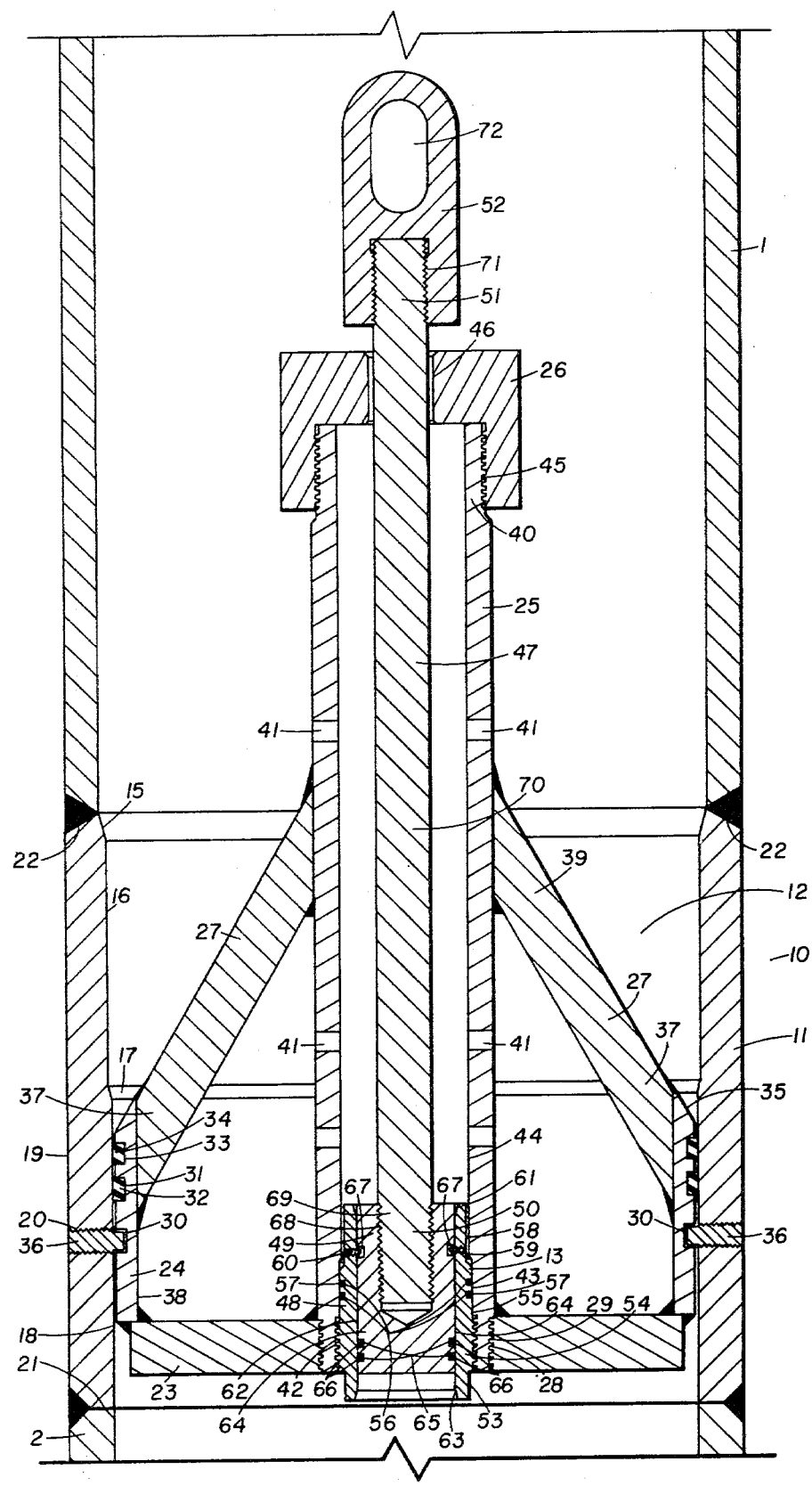
FIG. 1 is a cross-sectional view of a first embodiment of the present invention installed in sealing engagement with a portion of conductor pipe.

Referring to FIG. 1, a preferred embodiment of the present invention is shown.

The plug 10 comprises a cylindrical housing 11, central body member 12 and pressure equalization means 13.

The cylindrical housing 11 comprises a cylindrical member 14 having a first annular chamfered surface 15, first cylindrical interior surface 16, second annular chamfered surface 17, second cylindrical interior surface 18 and exterior cylindrical surface 19.

The exterior cylindrical surface 19 contains a plurality of threaded apertures 20 therein which extend through the cylindrical housing 11 and terminate at the second cylindrical interior surface 18.

The lower end surface 21 of the cylindrical housing 11 abuts the surface of a portion of conductor pipe 2 being secured thereto by any suitable means, such as welding. The upper chamfered end surface 22 of the cylindrical housing 11 abuts the surface of a portion of conductor pipe 1 which is secured thereto by any suitable means, such as welding.

It should be noted that the portion of conductor pipe 1 is formed having a larger internal diameter than the internal diameter of the portion of conductor pipe 2. The plug 10 should always be installed having upper chamfered end surface 22 of the cylindrical housing 11 abutting the conductor pipe having the largest internal diameter thereby allowing the plug 10 to be easily removed therethrough.

The central body member 12 comprises circular plug means 23, annular wall means 24, cylindrical body means 25, cap means 26 and reinforcing means 27.

The circular plug means 23 comprises a circular plug member of smaller diameter than second cylindrical interior surface 18 of the cylindrical housing 11. The circular plug means 23 has a central threaded aperture 28 into which is threadedly received the exteriorly threaded end portion 29 of cylindrical body means 25. The cylindrical body means 25 is further secured to the circular plug means 23 by welding. Secured to the outer periphery of the circular plug means 23 by any suitable means, such as welding, is the annular wall means 24.

The annular wall means 24 comprises a cylindrical member having a plurality of blind apertures 30 therein receiving a plurality of shear pins 36 therein which are threadedly engaged in threaded apertures 20 of cylindrical housing 11, a first annular seal cavity 31 having seal means 32 therein and second annular seal cavity 33 having seal means 34 therein. The upper annular surface 35 of the annular wall means 24 is chamfered to allow the central body member 12 to be withdrawn through the portion of conductor pipe 1 while the lower annular surface 37 of the annular wall means 24 abuts circular plug means 23.

The seal means 32 and 34 installed in seal cavities 31 and 33 respectively may be of any suitable cross-sectional configuration and of any suitable elastomeric material, although a seal means having a rectangular cross-sectional configuration is preferred.

Although the annular wall means 24 is formed having a plurality of apertures 30 therein to receive shear pins 36 therein, a continuous annular channel or a plurality of threaded apertures could be substituted for the apertures 30, if so desired.

To reinforce annular wall means 24 a plurality of reinforcing means 27 are used, each having one end 37 thereof secured about the inner diameter 38 of the cylindrical wall means 24 while the other end 39 thereof is secured to cylindrical body means 25. The reinforcing means 27 are secured to the annular wall means 24 and cylindrical body means 25 by any suitable means, such as welding. The reinforcing means may be of any suitable cross-sectional configuration, such as circular, rectangular, square, etc.

The cylindrical body means 25 comprises a cylindrical member having threaded end portion 29 thereof threadedly engaging threaded aperture 28 of circular plug means 23 while threaded end portion 40 engages cap means 26, and having a plurality of apertures 41 extending through the wall of the cylindrical member to allow communication of the interior of the cylindrical body means 25 with the exterior thereof. The interior of the cyindrical body means 25 is formed having a threaded bore 42, a first cylindrical bore 43 and second cylindrical bore 44.

Cap means 26 comprises a cap member having a threaded bore 45 which threadedly engages threaded end portion 40 of the cylindrical body means 25 and cylindrical bore 46 through which cylindrical rod means 47 of pressure equalization means 13 extends.

Pressure equalization means 13 comprises sleeve means 48, plug means 49 and cylindrical rod means 47 having one end 50 thereof threadedly engaging plug means 49 while the other end 51 thereof threadedly engages eyelet means 52.

The sleeve means 48 comprises a cylindrical sleeve member having a first cylindrical exterior surface 53, threaded exterior surface 54 which engages threaded bore 42 of cylindrical body means 25 to retain the sleeve means 48 therein, second cylindrical exterior surface 55 having seal cavities 56 therein which contain seal member 57 therein, third cylindrical surface 58 having a plurality of threaded apertures 59 therethrough which receive threaded shear pins 60 therein, first interior chamfered annular surface 61, bore 62 and second interior chamfered annular surface 63. Received within bore 62 of sleeve means 48 is plug means 49.

Plug means 49 comprises a cylindrical plug member having an exterior surface 64 which contains seal cavities 65 having seal means 66 therein and a plurality of blind apertures 67 which each receive a portion of shear pins 60 therein, and having a threaded bore 68 therein which threadedly engages threaded end portion 69 of cylindrical rod means 47.

The cylindrical rod means 47 comprises a cylindrical rod member having threaded end portion 69, body portion 70 which extends through bore 46 of cap means 26 and threaded end portion 51 which threadedly engages threaded bore 71 of eyelet means 52.

Eyelet means 52 comprises a cylindrical eyelet member having a threaded bore 71 therein and eyelet opening 72 which receives a hoisting means (not shown).

It should be noted that the seal means 57 installed in seal cavities 56 and seal means 66 installed in seal cavities 65 may be any suitable type seal means, such as an elastomeric O-ring type seal means.

As shown in FIG. 1, the plug 10 is installed between conductor pipe portion 1 and conductor pipe portion 2 by welding cylindrical housing means 11 to the conductor pipe portions. The central body member 12 is retained within cylindrical housing means 11 by shear pins 36 engaging blind apertures 30 of the annular wall means 24 of the central body member 12. Seal means 32 and 34 retained within seal cavities 31 and 33 respectively of the annular wall means 24 sealingly engage second cylindrical interior surface 18 of cylindrical housing means 11.

Similarly, the pressure equalization means 13 is retained within central body portion 12 by sleeve means 48 having threaded exterior surface 54 thereof engaging threaded bore 42 of cylindrical body means 25 while plug means 49 is retained within sleeve means 48 by shear pins 60, which are threadedly received in threaded apertures 59 of sleeve means 48, extending into blind apertures 67 of plug means 49. The sleeve means 48 has seal means 57 thereof sealingly engaging first bore 43 of cylindrical body means 25 while plug means 49 has seal means 66 thereof sealingly engaging bore 62 of sleeve means 48.

Figure 2:
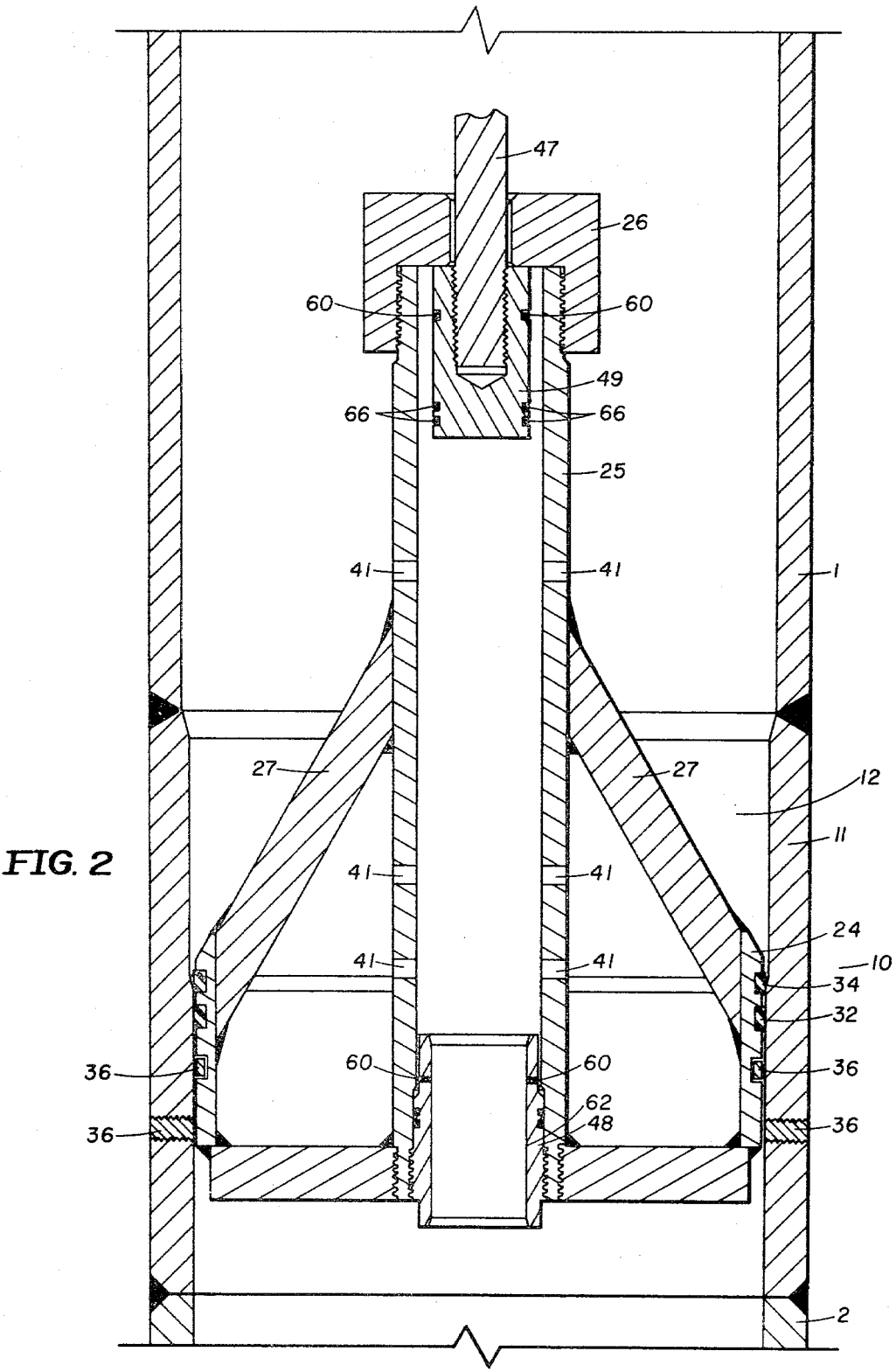
FIG. 2 is a cross-sectional view of the embodiment of the present invention shown in FIG. 1 being removed from sealing engagement with a portion of conductor pipe.

Referring to FIG. 2, the plug 10 is shown being removed from conductor pipe portions 1 and 2.

To remove the central body portion 12 of the plug 10 from cylindrical housing 11 a force is applied to eyelet means 52 to shear pins 60 extending from sleeve means 48 into plug means 49. When shear pins 60 have been sheared, plug means 49 moves upwardly in cylindrical body means 25 until the upper surface of the plug means 49 abuts the lower surface of cap means 26.

Since the seal means 66 of the plug means 49 no longer engages bore 62 of sleeve means 48, fluid may flow through bore 62 of sleeve means 48 into second cylindrical bore 44 of cylindrical body means 25 and out apertures 41 therein. When the fluid pressure has equalized across central body portion 12 of the plug 10, force is applied to eyelet means 52 to shear pins 36 extending from cylindrical housing 11 in annular wall means 24 of central body portion 12.

After shear pins 36 have been sheared, the central body portion 12 is removed from the cylindrical housing 11 by continuing to apply a force through eyelet 52 thereby also causing the central body portion 12 of the plug 10 to be removed from conductor pipe portion 1.

It should be noted that should central body portion 12 become stuck in conductor pipe portion 1 during removal therefrom, force can be released and reapplied through eyelet 52 to cause hammering of the plug means 49 against cap means 26 to free the central body portion 12 of the plug 10 from the conductor pipe portion 1.

Figure 3:
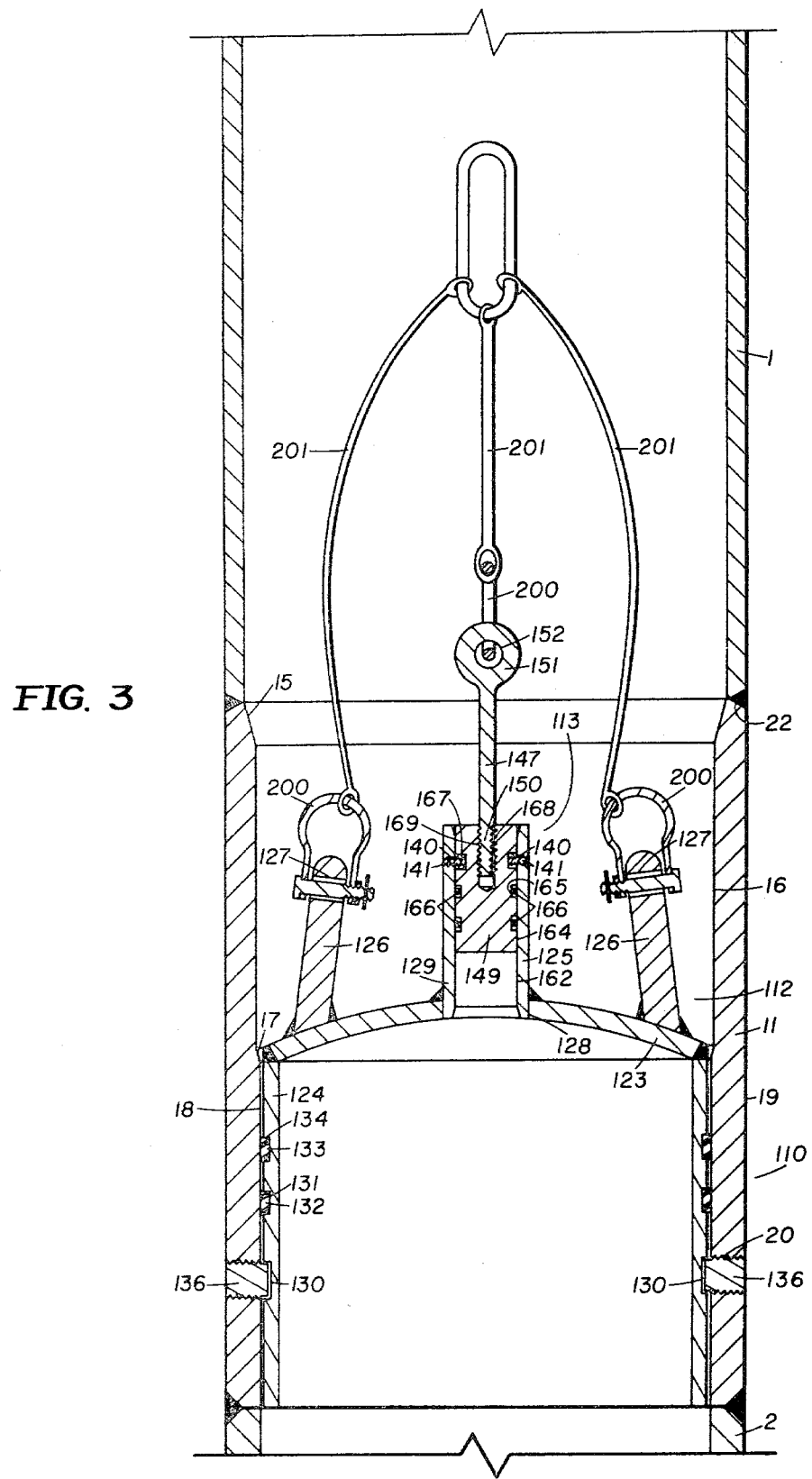
FIG. 3 is a cross-sectional view of a second embodiment of the present invention installed in sealing engagement with a portion of conductor pipe.

Referring to FIG. 3, an alternative preferred embodiment of the present invention is shown. As shown in FIG. 3, a plug 110 is installed between conductor pipe portion 1 and conductor pipe portion 2 and secured thereto by any suitable means, such as welding.

The plug 110 comprises cylindrical housing means 11, central body portion 112 and pressure equalization means 113.

As shown previously in FIG. 1 and FIG. 2, the cylindrical housing 11 comprises a cylindrical member 14 having a first annular chamfered surface 15, first cylindrical interior surface 16, second annular chamfered surface 17, second cylindrical interior surface 18 and exterior cylindrical surface 19.

The exterior cylindrical surface 19 contains a plurality of threaded apertures 20 therein which terminate at the second cylindrical interior surface 18.

The lower end surface 21 of the cylindrical housing 11 abuts the surface of a portion of conductor pipe 2 while upper chamfered end surface 22 of the cylindrical housing 11 abuts the surface of a portion of conductor pipe 1.

It should be noted that the portion of conductor pipe 1 is formed having a larger internal diameter than the internal diameter of the portion of conductor pipe 2. The plug 110 should always be installed having upper chamfered end surface 22 of the cylindrical housing 11 abutting the conductor pipe having the largest internal diameter thereby allowing the plug 110 to be easily removed therethrough.

The central body member 112 comprises dished circular plug means 123, annular wall means 124, cylindrical body means 125 and a plurality of lifting means 126.

The dished circular plug means 123 comprises a dished circular plug member of smaller diameter than second cylindrical interior surface 18 of cylindrical housing 11. The dished circular plug means 123 has a central aperture 128 into which is received end portion 129 of cylindrical body means 125. The cylindrical body means 125 is secured to the circular plug means 123 by any suitable means, such as welding. Secured to the outer periphery of the dished circular plug means 123 by any suitable means, such as welding, is the annular wall means 124.

The annular wall means 124 comprises a cylindrical member having a plurality of blind apertures 130 therein receiving a plurality of shear pins 136 therein which are threadedly engaged in threaded apertures 20, a first annular seal cavity 131 having seal means 132 therein and second annular seal cavity 133 having seal means 134 therein.

The seal means 132 and 134 installed in seal cavities 131 and 133 respectively may be of any suitable cross-sectional configuration and of any suitable elastomeric material, although a seal means having a rectangular cross-sectional configuration is preferred.

It should be noted that although the annular wall means 124 is formed having a plurality of apertures 130 therein to receive shear pins 136 therein, a continuous annular channel or a plurality of threaded apertures could be substituted for the apertures 130, if desired.

The cylindrical body means 125 comprises a cylindrical member having an end portion 129 thereof engaging aperture 128 of dished circular plug means 123 while the other end portion thereof engages pressure equalization means 113. The cylindrical body means 125 is formed having a plurality of threaded apertures 140 therein which threadedly engage shear pins 141 which extend into pressure equalization means 113 retaining the same within cylindrical body means 125.

Pressure equalization means 113 comprises plug means 149 and cylindrical rod means 147 having one end 150 thereof threadedly engaging plug means 149 while the other end 151 is formed into an eyelet having an opening 152 therein.

Plug means 149 comprises a cylindrical plug member having an exterior surface 164 which contains seal cavities 165 having seal means 166 therein and a plurality of blind apertures 167 which each receive a portion of shear pins 141 therein and having a threaded bore 168 therein which threadedly engages threaded end portion 169 of cylindrical rod means 147.

It should be noted that the seal means 166 installed in seal cavities 165 may be any suitable type seal means, such as an elastomeric O-ring type seal means.

The lifting means 126 comprise a cylindrical member having one end thereof secured to dished circular plug means 123 while the other end thereof contains an aperture 127 therethrough which may receive any suitable type hoisting means, such as a clevis 200 and cable 201. Although the lifting means 126 is shown as a cylindrical member, any suitable cross-sectional shape lifting means may be used.

As shown in FIG. 3, the plug 110 is installed between conductor pipe portion 1 and conductor pipe portion 2 by welding cylindrical case means 11 to the conductor pipe portions. The central body member 112 is retained within cylindrical case means 11 by shear pins 136 engaging blind apertures 130 of the annular wall means 124 of the central body member 112. Seal means 132 and 134 retained within seal cavities 131 and 133 respectively of the annular wall means 124 sealingly engage second cylindrical interior surface 18 of cylindrical case means 11.

Similarly, the pressure equalization means 113 is retained within central body portion 112 by shear pins 141 which are threadedly received in threaded apertures 140 of cylindrical body means 125 extending into blind apertures 167 of plug means 149. The seal means 166 of plug means 149 sealingly engages bore 162 of cylindrical body means 125.

Figure 4:
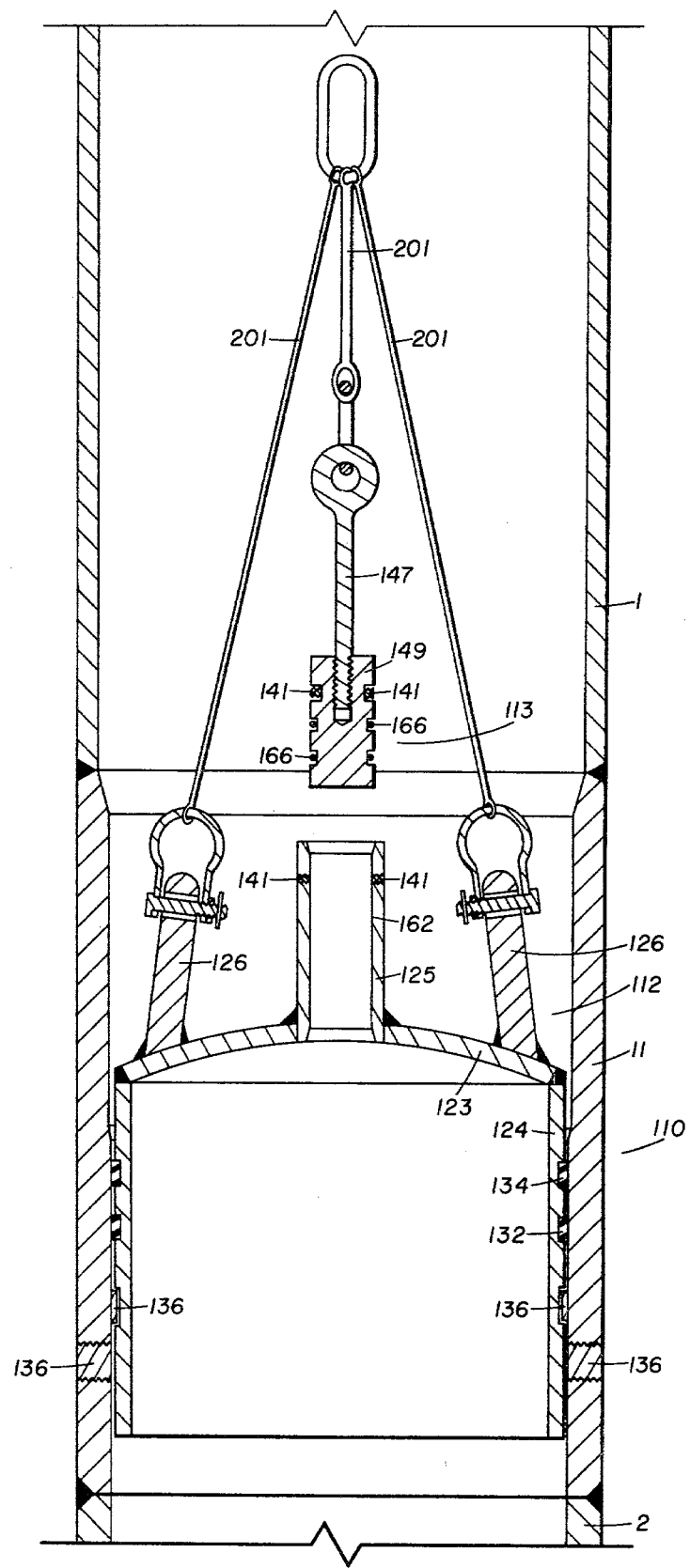
FIG. 4 is a cross-sectional view of the embodiment of the present invention shown in FIG. 3 being removed from sealing engagement with a portion of conductor pipe.

Referring to FIG. 4, the plug 110 is shown being removed from conductor pipe portions 1 and 2.

To remove the central body portion 112 of the plug 110 from cylindrical housing 11, a force is applied to cylindrical rod means 147 to shear pins 141 extending from cylindrical body member 125 into plug means 149. When shear pins 141 have been sheared, plug means 149 moves upwardly and out cylindrical body means 125.

Since the plug means 149 no longer engages cylindrical body means 125, fluid may flow through bore 162 of the cylindrical body means 125. When the fluid pressure has equalized across central body portion 112 of the plug 110, force is applied to lifting means 126 to shear pins 136 extending from cylindrical housing 11 into annular wall means 124 of central body portion 112.

After shear pins 136 have been sheared, the central body portion 112 is removed from the cylindrical housing 11 by continuing to apply a force through lifting members 126 thereby also causing the central body portion 112 of the plug 110 to be removed from conductor pipe portion 1.

It should be noted that after removal from the conductor pipe the central body portions 12 and 112 of the plug 10 and 110 can be used in other conductor pipe by providing a cylindrical housing means 11 and replacing the appropriate shear pins 36, 60 and 136, 141 respectively to retain the plugs 10 and 110 within the cylindrical housing means 11 and plug means 49 and 149 within the central body members 12 and 112.

It should also be noted that, if desired, the pressure equalization means 13 and 113 may be deleted from the plugs 10 and 110 respectively. However, if the pressure equalization means 13 and 113 are deleted from the plugs 10 and 110 respectively, it will be necessary to fill the conductor pipe portion with fluid before attempting to remove either the plug 10 or 110 to prevent the large hydrostatic forces which occur across the plug from causing/it to be rapidly forced up the conductor pipe portion by the fluid filling that portion of the conductor pipe.

Although this invention has been described in reference to sealing the interior of the conductor pipe of off-shore platforms, it is understood that the invention may be used to seal the interior of any cylindrical member.

Having thus described my invention, I claim:

1. A plug for sealing the interior of a hollow cylindrical member to prevent the flow of fluid therethrough, said plug releasably secured within said hollow cylindrical member being removable therefrom by the application of a first force and a larger second force thereto, said plug comprising:

cylindrical housing means connected to said hollow cylindrical member, said cylindrical housing means comprising:
hollow cylindrical means having a first interior annular chamfered surface, having a first cylindrical interior surface, having a second interior annular chamfered surface, having a second cylindrical interior surface, having an exterior cylindrical surface and having a plurality of apertures in the exterior cylindrical surface extending into the second cylindrical interior surface;

central body means releasably secured to said cylindrical housing in sealing engagement with an interior surface of said cylindrical housing means, said central body means comprising:

dished circular plug means having a central opening therein;

annular wall means secured to the outer periphery of the dished circular plug means, the annular wall means having seal cavity means in the outer surface thereof, having annular seal means installed in the seal cavity means sealingly engaging the second cylindrical interior surface of said cylindrical housing means and having aperture means located in the outer surface thereof extending through a portion of the thickness of the annular wall means;

hollow cylindrical body means secured about the periphery of the central opening of the dished circular plug means, the hollow cylindrical body means having aperture means extending through the wall thereof; and a plurality of lifting means secured to the dished circular plug means to allow the removal of said plug from the interior of said hollow cylindrical member, each lifting means of the plurality of lifting means having a portion thereof secured to the dished circular plug means and having aperture means in another portion thereof;

pressure equalization means for allowing the pressure of said fluid to equalize across said central body means before the removal thereof from said cylindrical housing means to allow the flow of said fluid through said hollow cylindrical member, said pressure equalization means comprising:

plug means releasably secured to the hollow cylindrical body means of said central body means having seal cavity means in the outer surface thereof, having annular seal means installed in the seal cavity means in the outer surface of the plug means sealingly engaging the interior of the hollow cylindrical body means, and having aperture means in the outer surface thereof; and rod means secured to the plug means to release said plug means from said sleeve means when a force is applied to said rod means;

first shear pin means having a portion thereof releasably secured within the apertures in the hollow cylindrical body means secured about the periphery of the central opening of the dished circular plug means and having a portion thereof extending into the aperture means in the outer surface of the plug means of the pressure equalization means to releasably secure the plug means to the hollow cylindrical body means, said first shear pin means being sheared by the application of said first force; and second shear pin means having a portion thereof releasably secured within the apertures of said cylindrical housing means and having a portion thereof extending into the apertures located in the outer surface of the annular wall means of said central body means to releasably secure said central body means within the said cylindrical housing means, said second shear pin means requiring said larger second force to shear the same, thereby allowing the removal of said central body means from said hollow cylindrical member.

* * * * *